United States Patent
Jaensch et al.

(10) Patent No.: US 11,152,797 B2
(45) Date of Patent: Oct. 19, 2021

(54) DC CHARGING OF AN INTELLIGENT BATTERY

(71) Applicant: Dr. Ing. h.c. F. Porsche Aktiengesellschaft, Stuttgart (DE)

(72) Inventors: Malte Jaensch, Bietigheim-Bissingen (DE); Jan Kacetl, Gemmrigheim (DE); Tomas Kacetl, Gemmrigheim (DE); Stefan Götz, Forstern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 238 days.

(21) Appl. No.: 16/353,436

(22) Filed: Mar. 14, 2019

(65) Prior Publication Data

US 2019/0288527 A1    Sep. 19, 2019

(30) Foreign Application Priority Data

Mar. 19, 2018 (DE) .......................... 102018106304.0

(51) Int. Cl.
*H02J 7/00* (2006.01)
*H01M 10/48* (2006.01)
(Continued)

(52) U.S. Cl.
CPC ....... *H02J 7/0024* (2013.01); *H01M 10/4257* (2013.01); *H01M 10/441* (2013.01);
(Continued)

(58) Field of Classification Search
CPC .................................................. H02J 7/0024
(Continued)

(56) References Cited

U.S. PATENT DOCUMENTS 9,368,992 B2   6/2016  Suzuki
9,496,799 B2   11/2016 Goetz
(Continued)

FOREIGN PATENT DOCUMENTS

CN    106026302 A    10/2016
CN    106684959 A    5/2017
(Continued)

OTHER PUBLICATIONS

Japanese Notice of Reasons for Refusal for Japanese Application No. 2019-043527, dated Feb. 12, 2020, with translation, 15 pages.
(Continued)

*Primary Examiner* — Yalkew Fantu
(74) *Attorney, Agent, or Firm* — RatnerPrestia

(57) ABSTRACT

A method for DC-charging an intelligent battery pack, which is connected to a charging column and has at least two battery modules. Each battery module includes at least two power semiconductor switches and at least one energy storage element. The battery pack is connected for charging by way of a connection circuit. A state of each individual energy storage element is monitored, wherein, in accordance with a continued evaluation of the states of the respective energy storage elements, a respective series and/or parallel interconnection of the respective battery modules among one another within the battery pack is configured dynamically by way of actuation of the power semiconductor switches.

19 Claims, 5 Drawing Sheets

(51) Int. Cl.
*H01M 10/42* (2006.01)
*H01M 10/44* (2006.01)

(52) U.S. Cl.
CPC ......... *H01M 10/482* (2013.01); *H02J 7/0021* (2013.01); *H01M 2010/4271* (2013.01)

(58) Field of Classification Search
USPC .......................................................... 320/117
See application file for complete search history.

(56) References Cited

U.S. PATENT DOCUMENTS

| | | | |
|---|---|---|---|
| 9,764,653 B2 | 9/2017 | Sarkar et al. | |
| 2003/0160593 A1* | 8/2003 | Yau | H02J 7/0018 320/116 |
| 2008/0067974 A1 | 3/2008 | Zhang et al. | |
| 2012/0105001 A1* | 5/2012 | Gallegos | H02J 7/0027 320/109 |
| 2012/0274140 A1* | 11/2012 | Ganor | B60L 58/21 307/71 |
| 2013/0026993 A1* | 1/2013 | Hintz | H02J 7/0016 320/119 |
| 2014/0152261 A1* | 6/2014 | Yamauchi | G01R 31/396 320/118 |
| 2014/0197684 A1 | 7/2014 | Masato et al. | |
| 2016/0336765 A1* | 11/2016 | Trimboli | H02J 7/0021 |
| 2018/0013339 A1 | 1/2018 | Göetz | |
| 2018/0034290 A1* | 2/2018 | Hinterberger | H01M 10/4257 |
| 2018/0212530 A1 | 7/2018 | Götz | |
| 2018/0219478 A1 | 8/2018 | Götz | |
| 2019/0001834 A1* | 1/2019 | Suzuki | B60L 11/1838 |

FOREIGN PATENT DOCUMENTS

| | | |
|---|---|---|
| DE | 102010052934 A1 | 5/2012 |
| DE | 102011108920 A1 | 1/2013 |
| DE | 102014004790 A1 | 10/2015 |
| DE | 102015211683 A1 | 12/2016 |
| DE | 102015112512 A1 | 2/2017 |
| DE | 102015112513 A1 | 2/2017 |
| DE | 102016112250 A1 | 1/2018 |
| JP | 1070838 A | 3/1998 |
| JP | 2006067683 A | 3/2006 |
| JP | 2010183769 A | 8/2010 |
| JP | 2011223653 A | 11/2011 |
| JP | 2013081316 A * | 5/2013 |
| JP | 2013081316 A | 5/2013 |
| WO | 2013119367 A1 | 8/2013 |
| WO | 2017149638 A1 | 9/2017 |

OTHER PUBLICATIONS

Indian Examination Report for Indian Application No. 201914005307, dated Jun. 9, 2020, with translation, 6 pages.
Japanese Office Action for Japanese Application No. 2019-043527, dated Jun. 24, 2020, 4 pages.

* cited by examiner

DC CHARGING OF AN INTELLIGENT BATTERY

CROSS-REFERENCE TO RELATED APPLICATION

This application claims priority to German Patent Application No. DE 10 2018 106 304.0, filed Mar. 19, 2018, which is incorporated by reference herein in its entirety.

FIELD OF THE INVENTION

The present invention relates to a method and an intelligent battery pack for charging using direct current, wherein the battery pack consists of a plurality of battery modules, which are each provided with at least two power semiconductor switches and at least one energy storage element. The adjustment of a voltage level of the intelligent battery pack to static or dynamic circumstances of a charging source is described.

BACKGROUND OF THE INVENTION

Battery packs conventionally installed in electric vehicles today are fixedly wired units, for example individual battery cells, whose prescribed series-parallel configuration or interconnection cannot be changed. This means that the same voltage used for discharging, for example in a power inverter, is also used for charging. The fixed wiring determines a maximum voltage of the battery pack in the case of a full state of charge and without aging phenomena. If the state of charge drops, the voltage of the fixedly wired battery pack can decrease by up to 50%.

A battery pack is also not provided with further control components for DC charging as standard. A charging socket is connected directly to the connection points of the battery or of the battery pack without any DC isolation, wherein a charging power is determined by a charging control. A conventional battery pack can thus be charged only by a controlled DC charge source with a prescribed voltage level, wherein 400 V and 800 V are typical voltage levels. If a rated voltage of the battery pack is higher than the maximum charging voltage of a charging column to be set, the battery pack cannot be charged at this charging column.

Moreover, in the case of a conventional battery pack, the individual battery cells or battery modules cannot be balanced out during charging with respect to the respective states of charge of the respective energy stores comprised by the individual battery modules. To this end, the charging is interrupted, usually shortly before a full state of charge of the battery pack is reached, the battery cells are balanced out either actively or passively and the charging is continued. This process is repeated until a state of charge of the battery pack of approximately 100% is reached.

With respect to the conventional implementations of a battery pack, modifications of the fixed wiring of the battery cells are known. Document DE 10 2014 004 790 A1, which is incorporated by reference herein, thus discloses a switchover device, which, for charging, can switch over two energy storage elements interconnected in parallel, corresponding to two battery cells, to a series circuit. In this case, a charging condition of an energy source outside of the vehicle is identified and an action of the switchover device is controlled in accordance with said charging condition. Energy storage elements should thus advantageously be connected together in such a way that they can be charged with a higher charging voltage and as a consequence thereof with a shorter charging time.

Document DE 10 2015 211 683 A1, which is incorporated by reference herein, describes a method for the secondary charging of an energy storage element by way of a backup battery system having a plurality of modules. The modules are connected to one another for charging at a power supply system in such a way that a voltage of the backup battery system is lower than a peak voltage of the power supply system. To charge the energy storage element, said modules are then reconfigured in a suitable manner.

Document US2014197684A, which is incorporated by reference herein, describes a control unit, which configures a series circuit of secondary battery cells. Depending on an output voltage level of a solar battery, a corresponding number of secondary battery cells are connected in series.

SUMMARY OF THE INVENTION

Described herein is a method for DC-charging a battery pack, in which the battery cells can be interconnected freely depending on requirements by the voltage level of the charging column or the state of charge of the individual battery cells, without circuitry requirements necessitating a switching contactor, a comparatively large and heavy electronic component, or similar protection means of the battery cells. It is also an object of the present invention to provide a corresponding intelligent battery pack for carrying out such a method.

A method for DC-charging an intelligent battery pack, which is connected to a charging column and has at least two battery modules, is proposed, which battery modules each comprise at least two power semiconductor switches and at least one energy storage element, in which the battery pack is connected for charging by means of a connection circuit and a state of each individual energy storage element is monitored, wherein, in accordance with a continued evaluation of the states of the respective energy storage elements, a respective series and/or parallel interconnection of the respective battery modules among one another within the battery pack is configured dynamically by way of actuation of the power semiconductor switches. Depending on the interconnection of the battery modules, a higher or lower voltage level is reached here than a nominal voltage level of the battery pack dimensioned for discharging. Such a battery pack can therefore be charged at a voltage level of the charging column that is independent of the nominal voltage level of said battery pack and, after charging, can assume an interconnection, for example a parallel interconnection of a plurality of battery modules, that is optimal for operation, for example for a power supply of an electric motor. In this case, a respective energy storage element can consist, for example, of a chemical voltage source or a fuel cell or another energy-storing unit. The state of the respective energy storage element can relate to a degree of charging, a number of charging cycles, an estimated age (referred to as state of health by those skilled in the art, shortened to SOH), a number of deep discharges, or another variable denoting a power of the energy storage element.

In one embodiment of the method according to aspects of the invention, in the interconnection, a selection is made dynamically between a series interconnection of adjacent battery modules and a parallel interconnection of adjacent battery modules. It is conceivable to also interconnect a plurality of battery modules, as purely adjacent battery modules, dynamically with one another by means of the power semiconductor switches.

In a further embodiment of the method according to aspects of the invention, at least one battery module is bypassed in the interconnection within the battery pack. This can take place, for example, when the state of a battery module or of the at least one energy storage element comprised by the battery module exceeds a limit of the state of charge, which limit is predetermined as a full charge. In particular, but also in the case of an inoperative energy storage element, for example due to aging, an option to bypass said energy storage element ensures the further operation of the entire battery pack.

In one embodiment of the method according to aspects of the invention, various charging modes are executed by way of a respective suitable interconnection of the battery modules. By way of example, charging that saves the lifetime of the energy storage elements, for example overnight, rapid charging, partial charging to a predetermined percentage of a total charging capacity, or use of additional sources, such as an AC source, for example, is conceivable as one possible charging mode.

In one embodiment of the method according to aspects of the invention, an exchange of energy between individual battery modules or the energy storage elements thereof is executed by way of a suitable interconnection of the battery modules. To this end, during charging of the battery pack, a respective battery module in which the monitoring of the state of the respective at least one energy storage element indicates charging that is lower in comparison with another battery module is connected in parallel with the other battery module so that an exchange of energy can take place between the two battery modules or between the energy storage elements thereof. This can take place taking into account a charge, through which a partial battery charging current $i_{TB,j}$ measured up to a time t, has flowed to an energy storage element j $$\int_{-\infty}^{t} i_{TB,j} dt \qquad (1)$$

In a further embodiment of the method according to aspects of the invention, the DC charging of the battery modules is executed under electrical, chemical and thermal conditions that are ideal for the respective energy storage elements by way of a suitable interconnection of the battery modules. From the knowledge of the type and the state of the respective energy storage element, the charging can take place in accordance with prescribed optimum conditions. For example, in order to reach an optimum operating temperature, the battery pack can be heated, which heating process, in particular in the case of connection to a charging column, can be fed thereby and is therefore possible for the battery pack without losses. In contrast, a charging current flowing to an energy storage element, possibly due to a changed interconnection of the battery module containing the relevant energy storage element, can be reduced when a prescribed temperature limit is exceeded during the charging by the energy storage element. Furthermore, the voltage level in the case of a chemical voltage source can advantageously be controlled in accordance with the characteristic optimum charging curve thereof through the interconnection of the battery modules.

In one embodiment of the method according to aspects of the invention, a voltage level of an uncontrolled charging column connected to the battery pack is identified continuously, where necessary periodically, and the interconnection of the battery modules is controlled in such a way that a voltage level of the battery pack is always below or equal to the voltage level of the charging column. Only when the voltage level of the battery pack caused by a respective interconnection of the battery modules is below the respective voltage level of the charging column does the connection circuit enable the charging of the battery pack. In this case, charging can take place at each charging column whose voltage level is lower than or equal to a maximum voltage level of the battery pack resulting from a series connection of all of the energy storage elements of the battery pack. The interconnection of the battery modules is preferably controlled in such a way that a highest possible voltage level for the battery pack is reached, which voltage level is still just below the identified voltage level of the charging column or corresponds thereto but is not in any case above said voltage level. To this end, the series or parallel interconnection is adjusted through the actuation of the power semiconductor switches of the battery modules.

In a further embodiment of the method according to aspects of the invention, in the case of a fully uncontrolled charging column connected to the battery pack, the intelligent battery pack executes current control, wherein the voltage level of the battery pack is controlled by way of the series and/or parallel interconnection of the battery modules among one another in continuous succession in order to cause a prescribed flow of current. To carry out smooth current control, that is to say not influenced by the discrete switching stages of a respective series-parallel configuration, the connection circuit can have an inductance as an additional electrical component. As an alternative, the inductance can also be brought about by way of a connection cable and already in a sufficient magnitude as a result.

In a still further embodiment of the method according to aspects of the invention, a voltage level of the battery pack is realized by way of alternating connection and disconnection of an individual battery module connected in series with the remaining battery pack or individual battery modules connected to the remaining or the other battery modules. A frequency or rate of an alternation between connection and disconnection is determined by the slowness of the energy storage element in the battery pack in reacting to the presence of a voltage. If said frequency is great enough, a value of a voltage level resulting not purely from a series-parallel configuration can result. In the same manner, with the aid of this method, refined switching stages can be achieved even in the case of current control.

In one embodiment of the method according to aspects of the invention, a surge current arising by way of a change in the interconnection of the battery modules is offset by a filter. Due to the change in the interconnection, a voltage difference can suddenly arise between the connection circuit of the battery pack and the charging column, which voltage difference results in a surge current. Such a surge current is advantageously offset by way of a filter located between the connection circuit to the charging column and the battery pack.

In one embodiment of the method according to aspects of the invention, a flowing charging current is measured and, depending on the respective states of the individual energy storage elements, is regulated. The regulation takes place through the configuration of the series and parallel interconnection of the battery modules, which determines the voltage level of the battery pack. The charging is terminated by minimizing the charging current and subsequently interrupting the connection circuit to the charging column.

In a further embodiment of the method according to aspects of the invention, the interconnection of the battery modules is controlled in such a way that the battery pack is in an ideal state for charging, wherein the ideal state is selected in accordance with a maximum efficiency point of the charging column or in accordance with a maximum efficiency point of an overall system consisting of the charging column, the battery pack and the connection circuit or an optimum time profile of the charging, which allows the battery pack to be altered minimally during rapid charging. The battery pack assumes an ideal state when the series-parallel configuration is designed so that a maximum transmission of energy from the charging column to the battery pack can take place in accordance with the respective states of charge of the battery modules. The ideal state can be identified, for example, by what is known as a "perturb-and-observe" method once or continuously during the charging process. In this case, when the method according to aspects of the invention is executed continuously at prescribed time intervals, the series-parallel configuration of the battery modules of the battery pack, similarly to a method for gradient determination known from numerical mathematics, changes in a plurality of directions of degree of freedom in order to ascertain whether the configuration is approaching the respectively selected ideal state or whether it is moving away therefrom. In the case of the charging column, the maximum efficiency point is given by such a combination of that charging voltage and that charging current that the charging column can provide without fluctuations and in which the charging column ensures the highest possible transmission of energy.

Furthermore, the battery pack follows a charging curve known from the prior art, as shown in FIG. 3. In this case, proceeding from an empty state, the charging curve is initially voltage-controlled and at the end of charging is current-controlled. Control of the two ranges can be effected both by the battery pack and by the charging column.

A battery pack that can be connected to a charging column for DC charging is also claimed, wherein the battery pack comprises at least two battery modules, which each comprise at least two power semiconductor switches and an energy storage element electrically connected to the at least two power semiconductor switches, sensors for determining a state of a respective energy storage element, a sensor associated with each battery module for measuring a flowing charging current, and a control unit provided with a computer processor and a computer program running on the computer processor, wherein the battery pack is designed to execute a method described above. Together with the installed sensors, the computer processor and the computer program running thereon represent an intelligence of the battery pack, whereby the interconnection is executed in accordance with a method described above.

In one configuration of the battery pack according to aspects of the invention, the battery pack additionally comprises a connection circuit having a filter, by means of which the battery pack can be connected to the charging column.

Finally, a motor vehicle provided with the battery pack according to aspects of the invention is claimed, which motor vehicle is configured to execute the method according to aspects of the invention.

BRIEF DESCRIPTION OF THE DRAWING

Further advantages and configurations of the invention emerge from the description and from the appended drawing.

It is self-evident that the features mentioned above and the features yet to be discussed below may be used not only in the respectively specified combination but also in other combinations or individually without departing from the scope of the present invention.

DETAILED DESCRIPTION OF THE INVENTION

Figure 1:
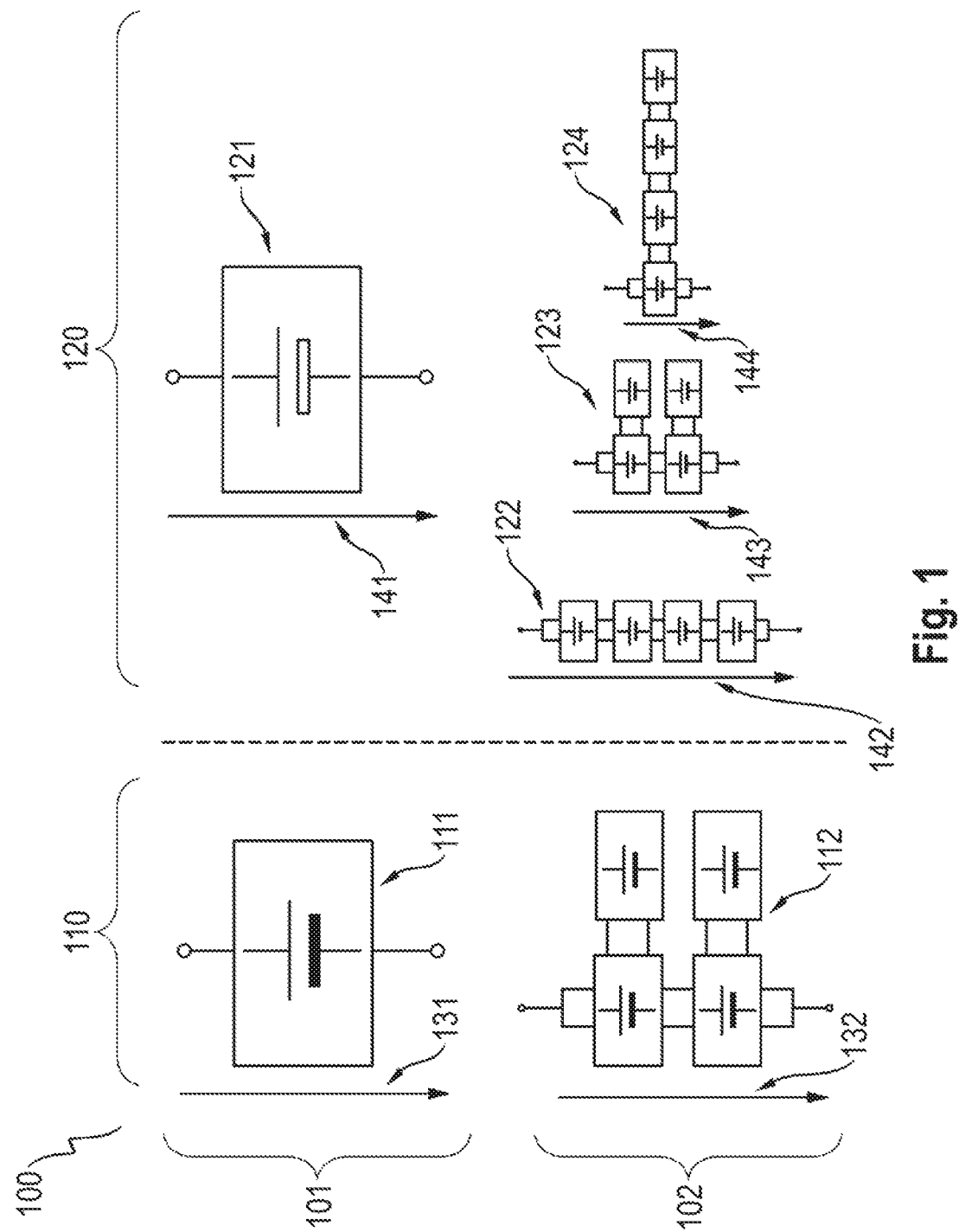
FIG. 1 shows by way of an example a schematic illustration of various configurations that can be assumed by one embodiment of the battery pack according to aspects of the invention.

FIG. 1 shows by way of example a schematic illustration 100 of, in addition to various configurations 112, 122, 123, 124 that can be assumed by a battery pack according to aspects of the invention, a battery pack 111, 121 according to the prior art as well. The left-hand column 110 represents nominal configurations 111, 112 that are assumed for discharging of a conventional and of an inventive battery pack, whereas the configurations 121, 122, 123, 124 in the right-hand column 120 are assumed for charging. In the top row 101, a conventional battery pack 111, 121 is shown, which consists of a single large battery module whose individual energy storage elements are wired to one another in a fixedly prescribed series-parallel configuration. The fixed wiring determines a nominal voltage level $U_n$, which represents a maximum voltage of the battery pack in the case of a fully charged battery module and which is provided in the case of discharging 131 of a circuit, or which has to be applied as charging voltage $U_{CH}=U_n$ in the case of charging 141. In the bottom row 102, an intelligent battery pack 112, 122, 123, 124 is shown, which is represented on the left-hand side in a nominal configuration 112 for discharging. By way of example, in configuration 112, two respective battery modules interconnected in parallel with one another and having power semiconductor switches are connected in series and have a nominal voltage level $U_n$, which is provided in the case of discharging 132 of a circuit. Each individual battery module of the battery packs 112, 122, 123, 124 illustrated in the series 102 comprises at least one energy storage element here and can, if it comprises a plurality of energy storage elements, be interconnected internally in a series-parallel manner likewise by means of power semiconductor switches. Finally, in the bottom row 102 in the right-hand column 120, various battery packs 122, 123, 124 interconnected by means of one embodiment of the method according to aspects of the invention are shown. Depending on the configuration, another voltage level of the charging voltage $U_{CH}$ is required for charging. For example, if a series connection of all of the battery modules 122 requires charging 142 at a maximum retrievable charging voltage $U_{CH,max}=2U_n$, a configuration 123 corresponding to the nominal configuration 112 requires a charging voltage $U_{CH}=U_n$ for charging 143, and a fully parallel interconnection of the battery modules would require a charging voltage $U_{CH}=U_n/2$ for charging 144.

Figure 2:
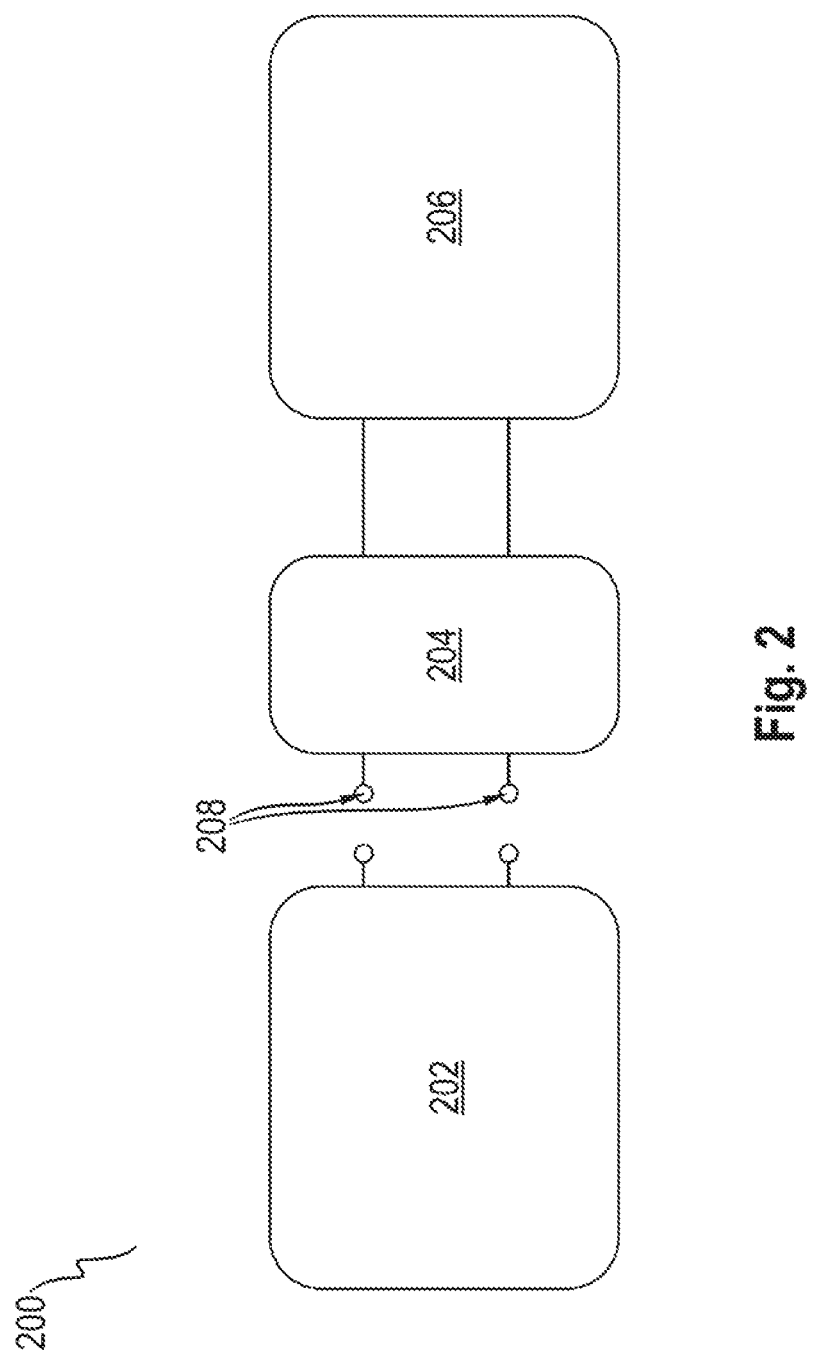
FIG. 2 shows a schematic illustration of a connection of a further embodiment of the battery pack according to aspects of the invention to a charging column by means of a filter.

FIG. 2 shows a schematic illustration of a connection circuit 200 to a connection 208 of one embodiment of the battery pack 206 according to aspects of the invention to a charging column 202 by means of a filter 204. By reconfiguring the battery modules of the battery pack and the interconnection that changes in the process, a voltage difference can arise suddenly between the connection 208 of the battery pack and the charging column 202, which voltage difference results in a surge current. Such a surge current is advantageously offset by a filter 204 located between the connection 208 and the battery pack 206.

Figure 3:
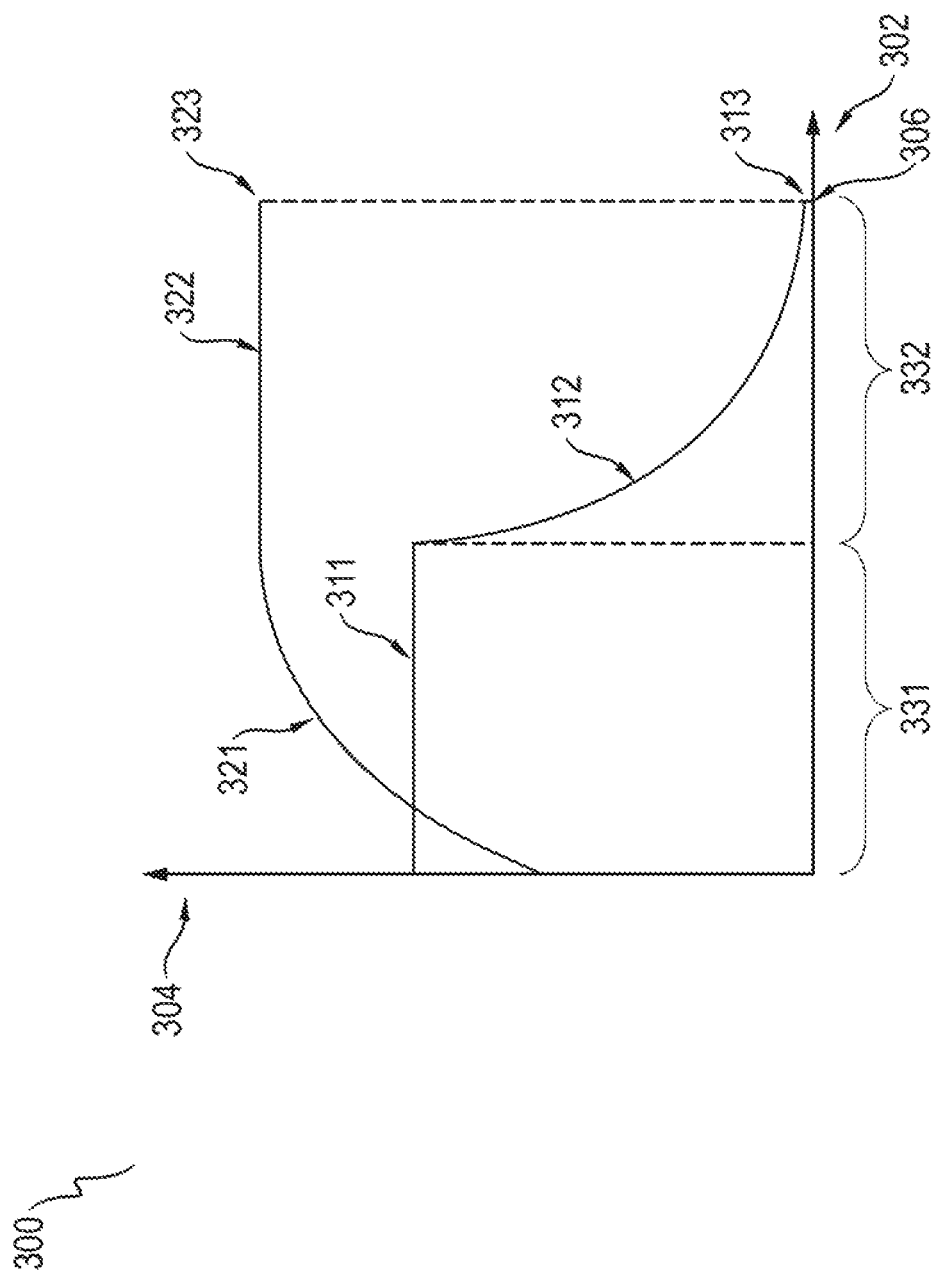
FIG. 3 shows a profile, known from the prior art, of a charging curve for charging a battery pack connected to a charging column.

FIG. 3 shows a profile 300, known from the prior art, of a charging curve for charging a battery pack connected to a charging column. In this case, a time profile 302 is plotted going to the right, a magnitude 304 of the respective charging voltage 321, 322, 323 and a charging current 311, 312, 313 are plotted going upward. Proceeding from an empty state, the charging in a first period 331 is initially voltage-controlled, that is to say that the charging voltage 321 increases whereas the charging current 311 remains constant. In a second period 332, the charging is then current-controlled, wherein the charging voltage 322 runs virtually constantly and the charging current 312 falls. The charging is then switched off at what is known as the "shut off point" 306, with a charging voltage final value 323 and a charging current final value 313. The charging current final value 313 may be 5% of the value of the charging current 311. Control during the two periods 331 and 332 can be effected both by the battery pack and by the charging column.

Figure 4:
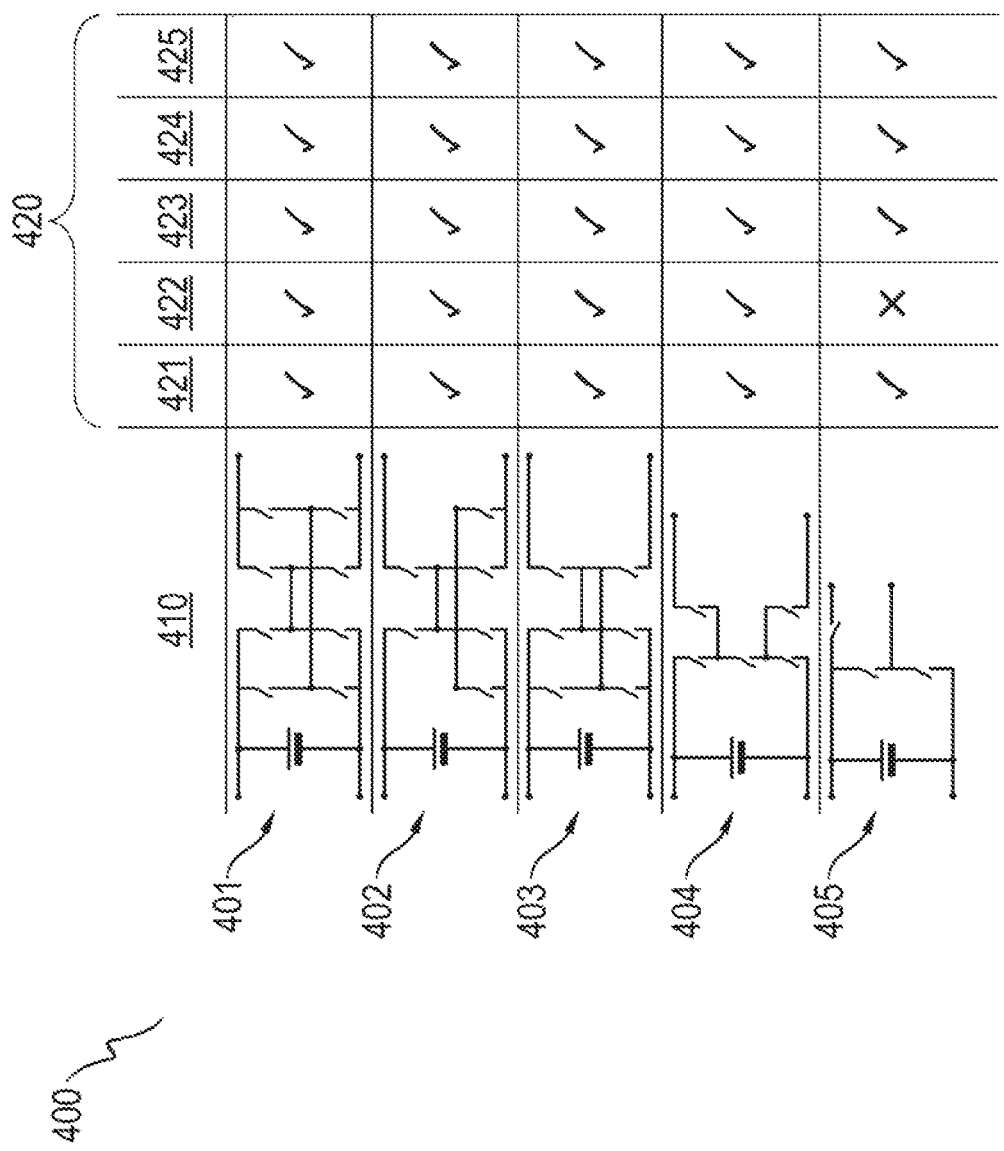
FIG. 4 shows a tabular illustration of possible implementations of the battery modules with embodiments of the method according to aspects of the invention.

FIG. 4 shows a tabular illustration 400 of possible implementations of the battery modules with embodiments of the method according to aspects of the invention. Plotted in the left-hand column 410 are various topologies 410, which permit a different connecting state 420 by way of a respective connecting option of the power semiconductor switches present in the respective topology 410. The plotted topologies 410 respectively show a multi-level converter 410 having eight power semiconductor switches, a multi-level converter 402 having six power semiconductor switches, a further multi-level converter 403 having six power semiconductor switches in what is known as a microtopology or module circuit different from the multi-level converter 402 under the possible topologies having six power semiconductor switches, a multi-level converter 404 having five power semiconductor switches, and a multi-level converter 405 having three power semiconductor switches. In some applications, not every connecting option of the power semiconductor switches is required to bring about a desired connecting state 420, which makes some of the power semiconductor switches of a multi-level converter 201 furnished with eight power semiconductor switches redundant. It is accordingly possible that the fewer connecting states 420, listed here for example a connecting state "S+" 421, a connecting state "S−" 422, a connecting state "P" 423, a connecting state "B+" 424, and a connecting state "B−" 425, are required, the more power semiconductor switches are saved. If, for example, under the connecting states 420, the connecting state "S−" 422 is not required, the multi-level converter 405 having only three power semiconductor switches can be used. A total resistance of a line path between the charging column and the battery modules, which total resistance is relevant for the charging current, is determined by the state of charge of the battery modules and a number of power semiconductor switches connected in line, that is to say closed power semiconductor switches. Various connecting options have different total resistances for the charging current depending on the present microtopology. Further microtopologies are cited, for example, in patent documents DE 10 2015 112 513, DE 10 2016 112 250, DE 10 2015 112 512, DE 10 2011 108 920 and DE 10 2010 052 934, each of which is incorporated by reference in its entirety.

Figure 5:
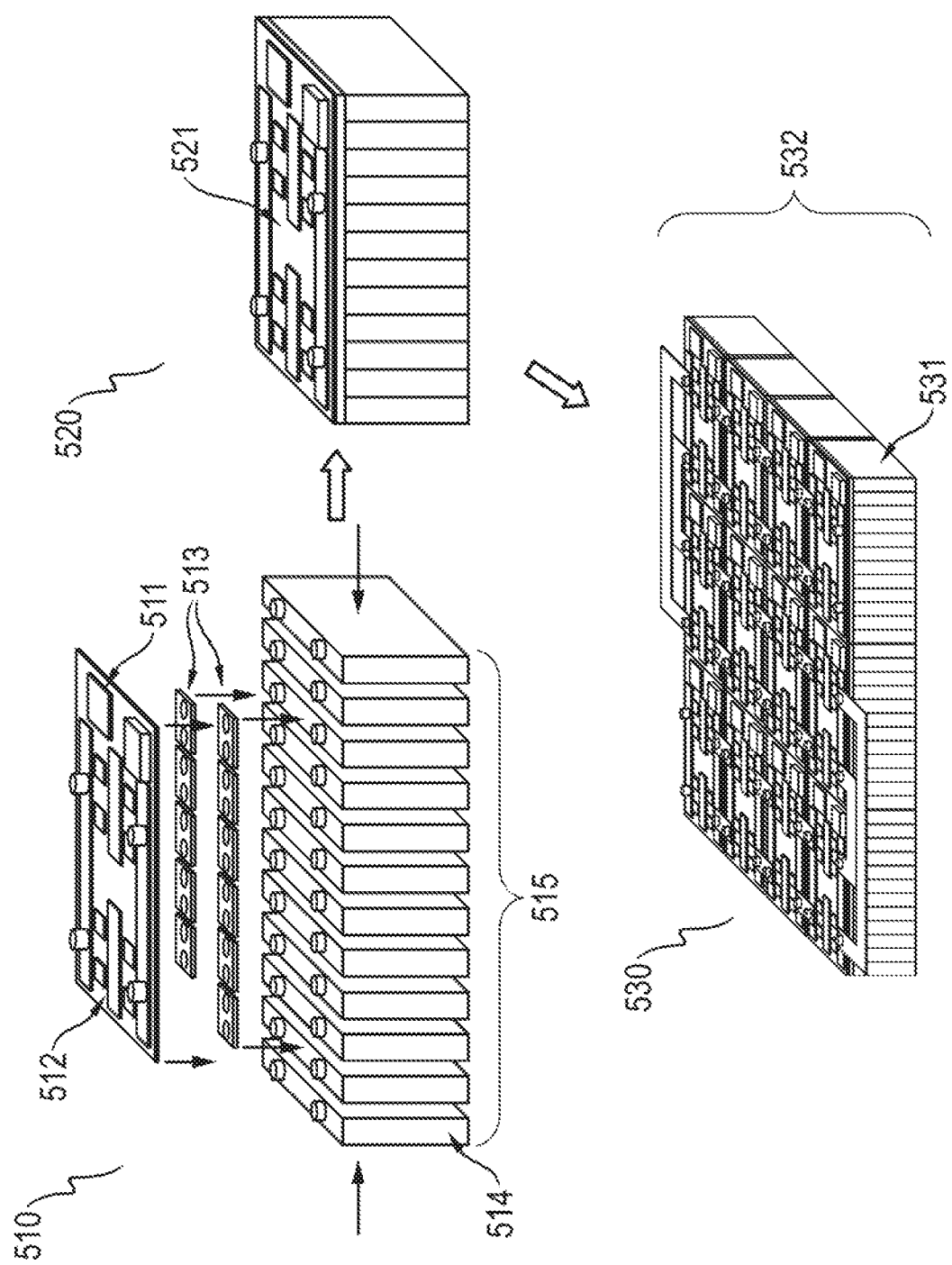
FIG. 5 shows a schematic illustration of an assembly of an intelligent battery pack in accordance with one embodiment of the method according to aspects of the invention.

FIG. 5 shows a schematic illustration of an assembly 510, 520, 530 of an intelligent battery pack 532 in accordance with one embodiment of the method according to aspects of the invention. In a first step, a multiplicity 515 of battery cells 514 are connected to a plurality of power semiconductor switches 512 by line elements 513 and an electronics system 511, as a result of which the battery module 521 is produced in a second step 520. A plurality of battery modules 531 produce the intelligent battery pack 532 in the third step 530.

What is claimed is:

1. A method for DC-charging an intelligent battery pack, which is connected to a charging column for charging by way of a connection circuit and has at least two battery modules, which each battery module comprises at least two power semiconductor switches and at least one energy storage element, the method comprising:
monitoring a state of each individual energy storage element; and
dynamically configuring at least one of a respective series and a parallel interconnection of the respective battery modules among one another within the battery pack by actuating the power semiconductor switches, and, in accordance with a continued monitoring of the states of the respective energy storage elements.

2. The method as claimed in claim 1, further comprising making a selection dynamically between a series interconnection of adjacent battery modules and a parallel interconnection of adjacent battery modules.

3. The method as claimed in claim 1, further comprising bypassing at least one of the battery modules in the interconnection within the battery pack.

4. The method as claimed in claim 1, further comprising executing various charging modes by way of a respective suitable interconnection of the battery modules.

5. The method as claimed in claim 1, further comprising executing an exchange of energy between individual battery modules by way of a suitable interconnection of the battery modules.

6. The method as claimed in claim 1, further comprising executing the DC charging of the battery modules under electrical, chemical and thermal conditions that are ideal for the respective energy storage elements by way of a suitable interconnection of the battery modules.

7. The method as claimed in claim 1, further comprising identifying a voltage level of an uncontrolled charging column connected to the battery pack, and controlling the interconnection of the battery modules in such a way that a voltage level of the battery pack is always below or equal to the voltage level of the charging column.

8. The method as claimed in claim 1, in which the intelligent battery pack connected to the charging column executes current control, and the method further comprises controlling the voltage level of the battery pack by way of the interconnection of the battery modules among one another in continuous succession in order to cause a prescribed flow of current.

9. The method as claimed in claim 1, further comprising realizing a voltage level of the battery pack by way of alternating connection and disconnection of an individual battery module connected in series with the remaining battery modules of the battery pack.

10. The method as claimed in claim 1, further comprising offsetting a surge current arising by way of a change in the interconnection of the battery modules using a filter.

11. The method as claimed in claim 1, further comprising measuring a flowing charging current and, depending on the respective states of the individual energy storage elements, regulating the flowing charging current through the dynamic configuration.

12. The method as claimed in claim 1, further comprising controlling the interconnection of the battery modules in such a way that the battery pack is in an ideal state for charging, wherein the ideal state is selected in accordance with a maximum efficiency point of the charging column or in accordance with a maximum efficiency point of an overall system comprising the charging column, the battery pack and the connection circuit or an optimum time profile of the charging, which allows the battery pack to be altered minimally.

13. The battery pack as claimed in claim 1, wherein the battery modules are separable and independent.

14. The battery pack as claimed in claim 1, wherein each battery module includes a plurality of individual energy storage elements that are stacked together.

15. A battery pack comprising:
at least two battery modules each comprising at least two power semiconductor switches and an energy storage element that is electrically connected to the at least two power semiconductor switches,
sensors for determining a state of a respective energy storage element,
a sensor associated with each battery module for measuring a flowing charging current, and
a control unit comprising a computer processor and a computer program running on the computer processor,
wherein the battery pack is configured to:
(i) monitor a state of each individual energy storage element; and
(ii) dynamically configure at least one of a respective series and a parallel interconnection of the respective battery modules among one another within the battery pack by actuating the power semiconductor switches, and, in accordance with a continued monitoring of the states of the respective energy storage elements.

16. The battery pack as claimed in claim 15, further comprising a connection circuit having an inductance.

17. The battery pack as claimed in claim 15, further comprising a connection circuit having a filter.

18. The battery pack as claimed in claim 15, wherein the battery modules are separable and independent.

19. The battery pack as claimed in claim 15, wherein each battery module includes a plurality of individual energy storage elements that are stacked together.

* * * * *